Jan. 10, 1956 R. A. LOEDERER 2,730,018
PERISCOPIC PEEP BOX
Filed April 15, 1953
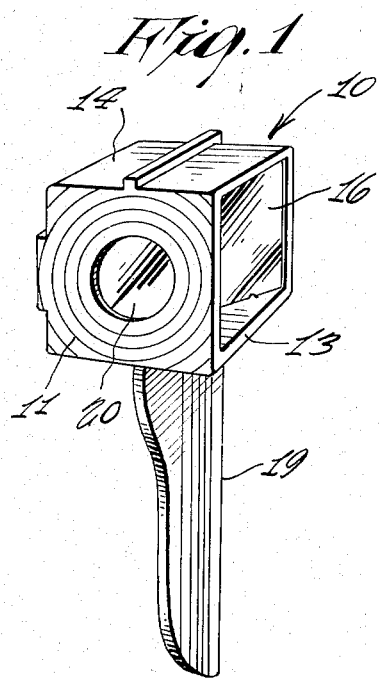
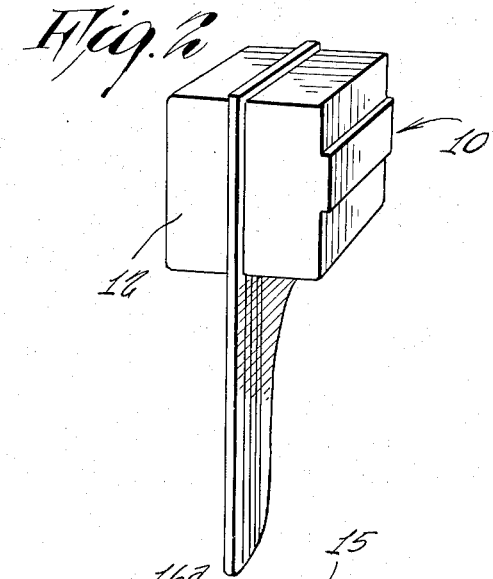
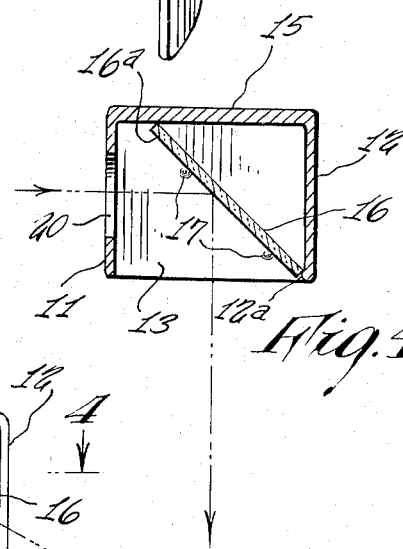
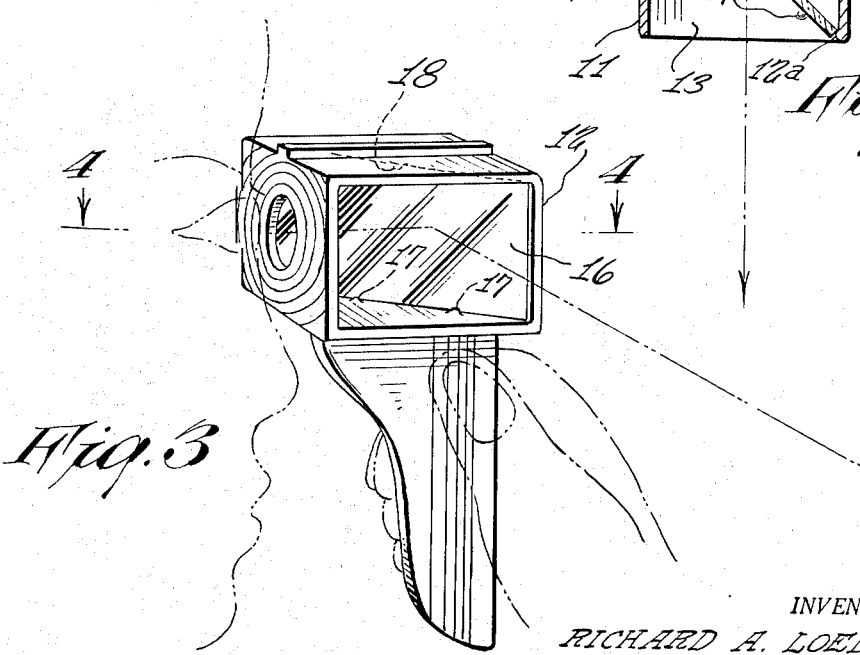
INVENTOR.
RICHARD A. LOEDERER
BY
ATTORNEY

United States Patent Office 2,730,018
Patented Jan. 10, 1956

2,730,018
PERISCOPIC PEEP BOX

Richard A. Loederer, New York, N. Y.

Application April 15, 1953, Serial No. 348,873

1 Claim. (Cl. 88—68)

This invention relates to viewing devices utilizing a mirror, and the main object is the provision of a novel and improved peep box including, broadly speaking, a box-like frame or housing having a vertical mirror mounted therein at an angle of, say, forty-five degrees to the axis of the opening or peep hole into which the viewer looks, whereby he sees the image of the view to right angles to his line of vision.

The above broad as well as additional and more specific objects will be clarified in the following description wherein characters of reference refer to like-numbered parts in the accompanying drawing.

Referring briefly to the drawing, Fig. 1 is a perspective view of the viewer or peep box of this invention, as seen from the front.

Fig. 2 is a perspective view of the same as seen from the rear.

Fig. 3 is a perspective view of the same as seen from the side, illustrating the manner of using the device.

Fig. 4 is a sectional view taken on the line 4—4 of Fig. 3.

Referring in detail to the drawing, the numeral 10 indicates a box-like frame or housing including the front wall 11, the rear wall 12, the bottom 13, the top 14, and one side wall 15, there being no side wall opposite the latter so that that entire side of the housing is open.

Vertically mounted approximately diagonally in the box is a mirror 16, with one edge substantially in contact with the outer edge of the rear wall 12, and extending at an angle of substantially forty-five degrees with respect to the walls 12 and 15. The mirror may be retained in this position by any suitable means such as, for example, a pair of raised approximately conical bosses 17 in the floor 13 and a like pair of depending bosses 18, or at least one of the latter, aligned with one or both of the bosses 17. Thus, with the outer edge of the mirror positioned as above-mentioned and the inner edge 16a positioned against the side wall 15, the bosses 17 and 18 provide stops against movement of the mirror from the walls 12 and 15. In other words, the mirror is clamped in the position shown between the said bosses and the said two walls. Owing to a degree of yieldability of the material forming the housing, the mirror may readily be inserted into its mounted position.

The housing is provided with a convenient handle 19 extending downward therefrom. As a further or additional securement of the mirror in place, the outer vertical edge of the wall 12 may be provided with a slight enlargement of ridge 12a, to insure that the mirror cannot slide out between the said edge of the wall 12 and the bosses.

As shown in Figs. 3 and 4, when a person holds the viewer as shown in Fig. 3, the line of sight, shown by the arrows in Fig. 4, is deflected at right angles and the view exposed to the open side (opposite the side wall 15) is deflected to the person using the device through the hole or opening 20 in the front wall 11. Thus, by using this device a person may see to one side without turning the head.

Obviously, modifications in form or structure may be made without departing from the spirit or scope of the invention.

I claim:

A device of the class described comprising a box-like housing having a peep hole in one end thereof, a vertical mirror mounted in the box at an angle of substantially forty-five degrees to the axis of said hole, one vertical edge of said mirror being positioned against the adjacent vertical edge of the other end of the housing, the side of the housing between said front and rear and adjacent said edge of said other end of the housing being open and unobstructed, the other vertical edge of the mirror being positioned against the other side of the housing, said other side of the housing having a wall closing the same, said housing having a handle, and means for retaining said mirror in position as aforesaid, said housing including top and bottom walls, said means comprising an upwardly extending boss on said bottom wall and a downwardly extending boss on said top wall, said bosses being vertically aligned and being positioned adjacent the face of said mirror thereby clamping said mirror between said bosses and said other side of the housing and said other end of the housing.

References Cited in the file of this patent

UNITED STATES PATENTS

| | | |
|---|---|---|
| 656,496 | Appleton | Aug. 21, 1900 |
| 1,264,133 | Morris | Apr. 23, 1918 |
| 1,603,331 | Downey | Oct. 19, 1926 |